Patented May 17, 1938

UNITED STATES PATENT OFFICE 2,117,431

ESTERS OF LEUCOACYLAMINO-ANTHRA-PYRIMIDINES

Karl Koeberle, Wilhelm Muenster, and Wilhelm Schneider, Ludwigshafen-on-the-Rhine, Germany, assignors to General Aniline Works, Inc., New York, N. Y., a corporation of Delaware No Drawing. Application August 6, 1937, Serial No. 157,738. In Germany April 4, 1935

8 Claims. (Cl. 260—32)

The present invention relates to water-soluble leuco compounds of the 1.9-anthrapyrimidine series and a process of producing them.

We have found acylamino-1.9-anthrapyrimidines can be converted into water-soluble leuco compounds which are in part leuco esters, by acting thereon below 60° C. with sulphur trioxide in the presence of a pyridine and copper while excluding moisture as far as possible.

As starting compounds may be mentioned for example the acylaminoanthrapyrimidines, described in the U. S. Patent No. 2,040,857.

Instead of pyridine it is preferable to employ technical mixtures of bases of the pyridine series which mixtures substantially consist of pyridine and its homologues. The term "a pyridine" used herein is to be understood as including such mixtures. The sulphur trioxide may advantageously be used in admixture with sulphuric acid or chlorsulphonic acid. For the purpose of separating the desired leuco compound the reaction product which is a pyridine salt of the leuco compound, is converted into a metal salt by the addition of salts such as common salt, potassium chloride or calcium chloride, thus giving corresponding metal salt of the leuco compound formed which may be filtered off and dried in the usual manner. If desired this salt may be redissolved in water and reprecipitated by the addition of a salt of the kind mentioned above. It is also preferable to keep the temperature as low as possible.

The yields according to this invention are usually very good and in many cases practically the theoretical yields. The compounds are further usually distinguished by great purity. If necessary they may be further purified for example by salting them out repeatedly. According to their method of preparation, their behavior, their properties and analysis, the compounds according to this invention have the following general structure

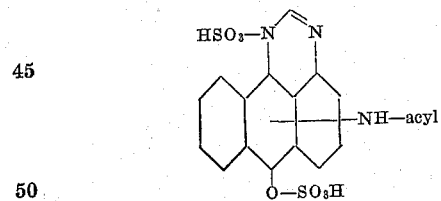

The compounds obtainable according to this invention are very readily suitable for being developed on the fibre by means of oxidizing agents giving dyeings which are distinguished by their clear shades of color and their favorable behavior against light and weathering.

The following examples will further illustrate how the said invention may be carried out in practice but this invention is not restricted to these examples. The parts are by weight if not stated otherwise.

This application is continuation-in-part of our copending application Ser. No. 70,608, filed March 24, 1936.

Example 1

A mixture of 700 parts of pyridine, 100 parts of sulphur trioxide, 100 parts of (2.5-dichlorbenzoyl) - 5 - amino - 1.9. - anthrapyrimidine and 35 parts of copper powder is stirred for an hour at 45° C. and half an hour at 50° C., the dyestuff thus passing into solution giving a deep brown coloration. The mixture is then cooled to about 10° C. and poured into ice-cold water, the pyridine salt of the ester thus separating as an oil. After washing with water, it is dissolved in 5 per cent aqueous ammonia and the solution is saturated with potassium chloride and stirred until the potassium salt of the ester has separated as a brown precipitate. It is filtered off by suction and the copper still present is removed by dissolution. The pure ester salt is brown-red, dissolves readily in water, has a very good affinity for vegetable and animal fibres, dyeing them brown-red shades, and may be readily reconverted into the yellow initial dyestuff by means of acid and an oxidizing agent such as a nitrite. The yield is about 85 per cent of the calculated yield. The leuco compound has the formula

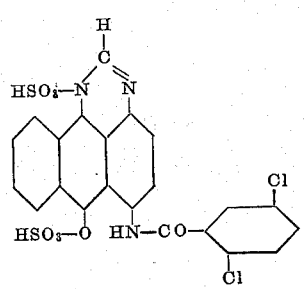

Instead of 2.5-dichlorbenzoyl-5-amino-1.9-anthrapyrimidine, other acylamino-1.9-anthrapyrimidines may be converted into water-soluble leuco compounds in a similar manner, for example the acylamino compounds of 5, 6, 7- or 8-amino or of 2, 3, 4- or Py.C-amino-1.9-anthrapyrimidines, the acyl radicle being derived from fluoro, alkyl, aryl, nitro, amino or acylamino benzoic acids of or carboxylic acids of substituted benzenes, such as chlorbrom, chlormethyl or chlorphenyl benzoic acids or from carboxylic acids of high molecular compounds, such as carboxylic acids of anthraquinones, nitroanthraquinones, benzanthraquinones, quinolines, naphthalenes, pyridinoanthraquinones, anthraquinoneacridones, anthraquinonethioxanthones, diphenyleneoxides, diphenylenesulphides, pyrenes, chrysenes, benzperylenes, perylenes, anthanthrones, carbazoles, allo-meso-naphthodianthrones and anthraquinonecarbazoles.

Instead of sulphur trioxide, mixtures of sulphur trioxide and chlorsulphonic acid may be employed. Furthermore alkylpyridines such as methylpyridine or ethylpyridine or mixtures containing them besides pyridine itself may be employed instead of pyridine.

*Example 2*

A mixture of 1000 parts of pyridine, 100 parts of a solution of 80 parts of sulphur trioxide in 20 parts of chlorsulphonic acid, 100 parts of (2.5-dichlorbenzoyl)-4-amino-1.9-anthrapyrimidine and 70 parts of copper powder is stirred for four hours at from 50° to 55° C., then allowed to cool to 20° C. and poured into 10,000 parts of ice-cold water, whereby a brown oil separates. The aqueous layer is poured off and the oil is washed with water, dissolved in 2000 parts of 10 per cent aqueous ammonia and then has added to it 10,000 parts of saturated common salt solution. The mixture is then stirred for 15 hours, the precipitate filtered off by suction, dissolved in 8000 parts of water, the solution filtered and 2000 parts of common salt added to the deep brown filtrate. The ester salt is thus precipitated in a good yield as a pale brown precipitate. It is filtered off by suction and brought into paste form. By developing the leuco compound on the fibre with an oxidizing agent such as sodium nitrite, very clear greenish-yellow dyeings are obtained which are distinguished by a very favorable behavior against light and weather and without affecting the fibre dyed therewith.

A similar leuco compound is obtained if instead of 2.5-dichlorbenzoyl-4-amino-1.9-anthrapyrimidine 4-amino-1.9-anthrapyrimidine itself or other acylamino derivatives thereof are employed. The said acylamino compounds may contain any substituent in the anthrapyrimidine nucleus, as for example halogen atoms or nitro, alkyl or aryl or further acylamino groups. For example, Py.C-methyl-4-acylamino-1.9-anthrapyrimidines or 2-brom-4-acylamino-1.9-anthrapyrimidines are suitable.

*Example 3*

A mixture of 175 parts of pyridine, 40 parts of 70 per cent fuming sulphuric acid, 25 parts of (2.4-dichlorbenzoyl)-4-aminoanthrapyrimidine and 25 parts of copper powder is stirred for three hours at from 45° to 50° C. and for an hour at 60° C. The pyridine salt of the ester is precipitated by pouring into water, dissolved in aqueous ammonia and the solution stirred with an addition of potassium chloride until the precipitate has become finely powdered. It is filtered off by suction and the residue is dissolved in water, filtered and potassium chloride is added to the red-brown filtrate. The ester salt of the leuco compound is thus obtained in the form of a pale brown precipitate which is brought into paste form.

In a corresponding manner water-soluble leuco compounds can be prepared from the acylamines described in the said U. S. Patent 2,040,857. They yield when developed with sodium nitrite in the presence of acetic acid on vegetable and animal fibres dyeings of good fastness properties.

*Example 4*

14.4 parts of the dyestuff obtainable by condensing 4-amino-1.9-anthrapyrimidine and anthraquinone-2-carboxylic acid chloride, and 15 parts of copper are introduced into a mixture of 150 parts of pyridine and 20 parts of sulphur trioxide. The mixture is stirred at 60° C. for two hours. After cooling the brown solution obtained it is poured into ice water and the pyridine compound of the leuco compound formed precipitated thereby is filtered off by suction, washed with water, and dissolved in 5 per cent aqueous ammonia solution. By adding potassium chloride to the said solution while stirring, the leuco compound formed is precipitated in the form of its potassium salt. It can be purified by redissolution. It may be made into a paste or converted into a dry powder in the usual manner.

What we claim is:—

1. A process of producing water-soluble leuco compounds which comprises acting on an acylamino-1.9-anthrapyrimidine with sulphur trioxide at below 60° C. in the presence of a pyridine and copper and isolating the end product by converting the reaction product formed into an alkali metal salt by means of an inorganic alkali metal salt, and filtration.

2. A process of producing water-soluble leuco compounds which comprises acting on an acylamino-1.9-anthrapyrimidine at below 60° C. in the presence of a pyridine and copper in the presence of an acid selected from the group consisting of chloro-sulphonic acid and sulphuric acid and isolating the end product by converting the reaction product formed into an alkali metal salt by means of an inorganic alkali metal salt, and filtration.

3. A leuco compound of the general formula

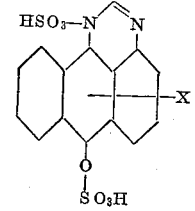

wherein X stands for an acylamino group.

4. A leuco compound of the general formula

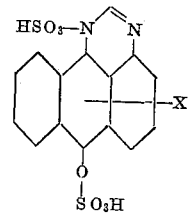

wherein X stands for an aroylamino group.

5. A leuco compound of the general formula

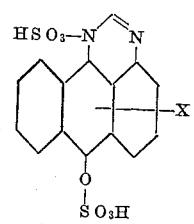

wherein X stands for a benzoylamino group.

6. A leuco compound of the general formula
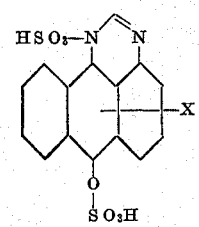
wherein X stands for a halogenbenzoyl group.
7. The water-soluble leuco compound of the compound having the formula
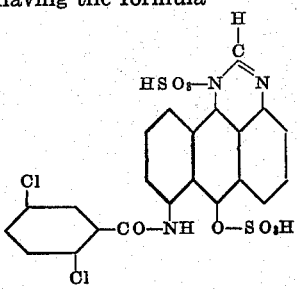
8. The water-soluble leuco compound of the compound having the formula
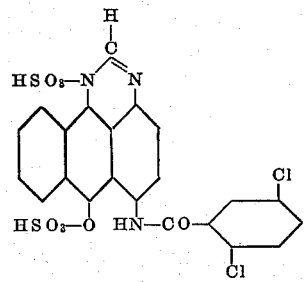
KARL KOEBERLE.
WILHELM MUENSTER.
WILHELM SCHNEIDER.